(12) United States Patent
He et al.

(10) Patent No.: US 10,913,650 B2
(45) Date of Patent: Feb. 9, 2021

(54) VALVE DEVICE FOR FUEL TANK

(71) Applicant: NIFCO INC., Yokosuka (JP)

(72) Inventors: Mingliang He, Yokosuka (JP); Xiaohui Sui, Yokosuka (JP); Yousuke Washio, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 16/458,889

(22) Filed: Jul. 1, 2019

(65) Prior Publication Data

US 2020/0031659 A1     Jan. 30, 2020

(30) Foreign Application Priority Data

Jul. 27, 2018 (JP) ................................. 2018-141151

(51) Int. Cl.
| | |
|---|---|
| *B60K 15/035* | (2006.01) |
| *B67D 7/36* | (2010.01) |
| *F16K 21/18* | (2006.01) |
| *B60K 15/03* | (2006.01) |

(52) U.S. Cl.
CPC .............. *B67D 7/365* (2013.01); *F16K 21/18* (2013.01); *B60K 15/035* (2013.01); *B60K 2015/03289* (2013.01)

(58) Field of Classification Search
CPC ....... B67D 7/365; F16K 21/18; F16K 24/044; F16K 11/05; F16K 17/36; F16K 31/20; F16K 24/042; B60K 15/035; B60K 2015/03289; B60K 15/03519; B60K 15/03296
See application file for complete search history.

(56) References Cited

U.S. PATENT DOCUMENTS

| | | | |
|---|---|---|---|
| 5,566,705 | A | 10/1996 | Harris |
| 6,959,720 | B2 | 11/2005 | Kurihara et al. |
| 2005/0229967 | A1 | 10/2005 | Ueki |
| 2010/0218748 | A1 | 9/2010 | Arnalsteen et al. |
| 2017/0274760 | A1* | 9/2017 | Mihara ............ F02M 37/0023 |

FOREIGN PATENT DOCUMENTS

JP       3911185 B2    5/2007

OTHER PUBLICATIONS

Europe Patent Office, "Search Report for European Patent Application No. 19185771.3," dated Dec. 12, 2019.

* cited by examiner

*Primary Examiner* — Jason K Niesz
(74) *Attorney, Agent, or Firm* — Manabu Kanesaka

(57) ABSTRACT

In a valve device for a fuel tank, a condition of blowing out a fuel to an outside of a fuel tank can be prevented as little as possible. The valve device includes a valve opening for communicating inside and outside of the fuel tank; a valve chamber formed below the valve opening; and a float disposed inside the valve chamber to be movable up and down, and the valve chamber has a structure of positioning an open end below a support portion of the float having a passage portion for a fluid. An orifice is formed in the support portion, and by a notch portion formed in the valve chamber, an entrance of an orifice-ventilation path communicating with the orifice is formed at a side lower than the support portion and at a side upper than the open end.

7 Claims, 15 Drawing Sheets

VALVE DEVICE FOR FUEL TANK

CROSS-REFERENCE TO RELATED APPLICATION

The present application is based on and claims priority of Japanese Patent Application No. 2018-141151 filed on Jul. 27, 2018, the disclosure of which is incorporated herein.

BACKGROUND OF THE INVENTION AND RELATED ART STATEMENT

The present invention relates to an improvement of a valve device for a fuel tank attached to a fuel tank of an automobile, a two-wheel vehicle, and the like so as to form one portion of a ventilation passage of the fuel tank for communicating inside and outside of the fuel tank in an open valve state.

As an excessive fuel feed prevention valve, there is an excessive fuel feed prevention valve shown in Patent Document 1 wherein a float member is housed inside a lower-portion chamber comprising a main inflow portion at a lower end, and a communication portion with an upper-portion chamber communicating with a canister rises by an inflow of a fuel into the main inflow portion to be closed.

According to the valve of the Patent Document 1, when a fuel liquid level inside the fuel tank reaches the main inflow portion, an internal pressure of the fuel tank can rise, so that by the fuel flowing into the lower-portion chamber, the float member rises so as to close the communication portion. Then, a fuel level inside a filler pipe rises, and a sensor of a fuel feed gun detects the first filling-up fuel feed so as to carry out an automatic stop of fuel feed.

In the valve shown in FIG. 7 to FIG. 10 of the Patent Document 1, there is formed a side-portion orifice at an upper side of the main inflow portion, and after the fuel feed stops by a detection of the first filling-up fuel feed, the fuel level inside the filler pipe goes down by ventilation through the side-portion orifice so as to allow additional fuel feed until the fuel liquid level reaches a level of the side-portion orifice.

However, in the valve of the Patent Document 1, when the float member rises, a gas (vapor) inside the fuel tank which enters into the lower-portion chamber from the side-portion orifice creates intense foaming inside the fuel entered into the lower-portion chamber, so that first, the gas has at least some effect on a regular rise of the float member. Also, second, before the float member rises to close the communication portion, the gas passes a side of the float member so as to generate a condition of blowing out the fuel inside the lower-portion chamber to an outside through the communication portion.

Patent Document 1
Japanese Patent No. 3911185

SUMMARY OF THE INVENTION

Problems to be Solved by the Invention

A main problem to be solved by the present invention is that in this type of valve device, a valve device with a structure of securing the regular rise of the float forming the valve device, reliably carrying out the detection of the first filling-up fuel feed, and preventing a condition of blowing out the fuel to an outside of the fuel tank through the valve device as little as possible, can be effectively provided.

Further objects and advantages of the invention will be apparent from the following description of the invention.

Means to Solve the Invention

In order to obtain the aforementioned object, in the present invention, a valve device for a fuel tank comprises a valve opening communicating inside and outside of a fuel tank; a valve chamber formed below the valve opening; and a float disposed inside the valve chamber to be movable up and down, and the valve chamber has a structure of positioning an open end below a support portion of the float having a passage portion for a fluid. Also, in the support portion, there is formed an orifice, and by a notch portion formed in the valve chamber, an entrance of an orifice-ventilation path communicating with the orifice is formed at a side lower than the support portion and at a side upper than the open end.

When a detection of the first filling-up fuel feed is carried out, a gas inside the fuel tank enters into the valve chamber through the orifice so as to create intense foaming inside the fuel entered into the valve chamber. However, since the orifice is formed in the support portion positioned at a side lower than the float, a condition wherein the gas entered from the orifice impacts on a regular rise of the float can be reduced as little as possible. Also, a condition wherein before the float rises to close the valve opening, the gas passes a side of the float so as to blow out the fuel inside the valve chamber to an outside through the valve opening, can be reduced as little as possible. Thereby, in the present invention, at the same time when a fuel liquid level reaches the open end of the valve chamber, the float rises to close the valve opening so as to reliably carry out the detection of the first filling-up fuel feed.

Then, in the present invention, the fuel feed stops by the detection of the filling-up fuel feed, and after a pressure inside the fuel tank is reduced, the float descends so as to open the valve opening, and to allow additional fuel feed until the fuel liquid level reaches the entrance of the orifice-ventilation path by ventilation through the orifice-ventilation path, the orifice, and the valve opening.

One of the aspects of the present invention is that when the fuel liquid level inside the fuel tank reaches the open end of the valve chamber, an internal pressure of the fuel tank rises so as to detect the filling-up fuel feed by a sensor on a fuel-feed gun side, and to allow the additional fuel feed after the detection of the filling-up fuel feed until the fuel liquid level reaches the entrance of the orifice-ventilation path.

Also, one of the aspects of the present invention is that two or more orifices are formed in the support portion, and the orifice-ventilation path includes paths respectively corresponding to the respective orifices.

Also, one of the aspects of the present invention is that the two or more orifices are formed in the support portion at a symmetric position relative to a center axis passing through a center of the float.

According to the present invention, a structure of securing the regular rise of the float forming the valve device, reliably carrying out the detection of the first filling-up fuel feed, and preventing a condition of blowing out the fuel to the outside of the fuel tank through the valve device as little as possible, can be effectively provided in the valve device.

DETAILED DESCRIPTION OF THE INVENTION

Figure 1:
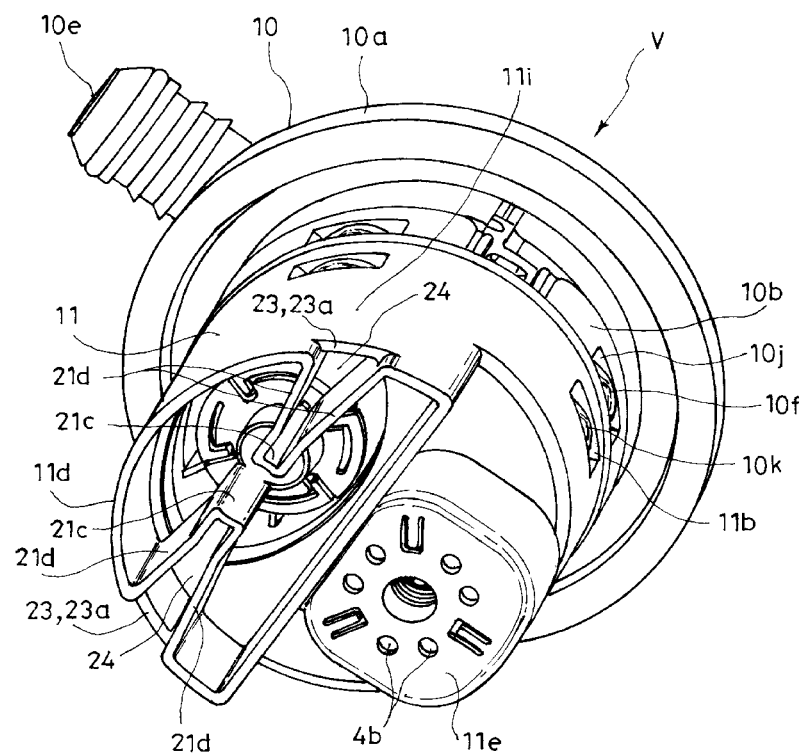
FIG. 1 is a perspective view of a valve device according to one embodiment of the present invention, and shows the valve device viewed from below.

Hereinafter, with reference to FIG. 1 to FIG. 15, a typical embodiment of the present invention will be explained. A valve device V according to the present embodiment is attached to a fuel tank T such as in an automobile, a two-wheel vehicle, and the like so as to form one portion of a ventilation passage of such fuel tank T, and functions for communicating inside and outside of the fuel tank T in an open valve state. Such valve device V is typically attached to an upper portion Ta of the fuel tank T to form one portion of the ventilation passage of the fuel tank T. As shown in an illustrated example, such valve device V can be provided in the fuel tank T using an attachment hole Tb provided in the fuel tank T, or using a bracket and the like (not shown in the drawings) provided inside the fuel tank T, or the like.

The valve device V comprises at least a first valve opening 1 and a second valve opening 2 communicating inside and outside of the fuel tank; a first valve chamber 3 formed below the first valve opening 1; a second valve chamber 4 formed below the second valve opening 2, and partitioned from the first valve chamber 3 by a partition wall 5; a first float 6 disposed inside the first valve chamber 3 to be movable up and down; and a second float 7 disposed inside the second valve chamber 4 to be movable up and down.

The first valve chamber 3 has a structure of positioning an open end 3e below a support portion 3a of the first float 6 having a passage portion 3d for a fluid.

On the other hand, the second valve chamber 4 comprises a support portion 4a of the second float 7 having a passage portion 4b for the fluid at a side slightly upper than the open end 3e of the first valve chamber 3.

The first valve chamber 3 and the second valve chamber 4 are partitioned by the partition wall 5 in an airtight state. The first valve chamber 3 communicates with an outside through the first valve opening 1, and the second valve chamber 4 communicates with the outside through the second valve opening 2. The first valve chamber 3 communicates with a space at a side upper than a fuel liquid level inside the fuel tank T through the open end 3e and the later-described upper-portion orifices 9, and the second valve chamber 4 communicates with the space at the side upper than the fuel liquid level inside the fuel tank T through the passage portion 4b of the support portion 4a and the later-described ventilation window hole 8.

According to such valve device V, when the fuel level (liquid level) inside the fuel tank T reaches the open end 3e of the first valve chamber 3 (a level shown by a symbol L1 in FIG. 4), a rise of an internal pressure of the fuel tank T, and an inflow of the fuel into the first valve chamber 3 accompanied by the rise of the internal pressure of the fuel tank T can be made. Thereby, the first float 6 rises to close the first valve opening 1, and by the rise of the internal pressure of the fuel tank T, the fuel level inside a filler pipe (not shown in the drawings) rises, and a sensor of a fuel feed gun (fuel feed nozzle) (not shown in the drawings) detects filling-up fuel feed so as to stop fuel feed (a detection of the first filling-up fuel feed).

Also, after the fuel feed stops by the detection of the first filling-up fuel feed, the internal pressure of the fuel tank T can be reduced by ventilation through the second valve chamber 4 and the second valve opening 2.

In the illustrated example, in a side portion of the second valve chamber 4 and above the support portion 4a, there is formed the ventilation window hole 8, and after the fuel feed stops, the ventilation is carried out mainly through the ventilation window hole 8 and the second valve opening 2.

Also, in the illustrated example, in a side portion of the first valve chamber 3 and above the support portion 3a, there are formed the upper-portion orifices 9, and after the fuel feed stops, by the ventilation through the upper-portion orifices 9 and a gap between the later-described flange-forming member 10a and a trunk member 10b, the internal pressure of the first valve chamber 3 is reduced, and the fuel level inside the first valve chamber 3 is lowered, so that the first float 6 descends so as to open the first valve opening 1.

Thereby, the fuel level inside the filler pipe is lowered so as to allow additional fuel feed. In the present embodiment, the first valve chamber 3 includes the later-described orifices 22 and orifice-ventilation paths 24, and entrances 24a of the orifice-ventilation paths 24 are positioned at a side lower than the support portion 3a and at a side upper than the open end 3e of the first valve chamber 3 by notch portions 23 formed in the open end 3e of the first valve chamber 3 so as to allow the additional fuel feed until the fuel liquid level inside the fuel tank T reaches the entrances 24a of the orifice-ventilation paths 24. By the additional fuel feed, when the fuel liquid level inside the fuel tank T reaches the entrances 24a of the orifice-ventilation paths 24 (a level shown by a symbol L2 in FIG. 4), the rise of the internal pressure of the fuel tank T and the inflow of the fuel into the first valve chamber 3 occur again, and the sensor of the fuel feed gun detects the filling-up fuel feed again so as to stop the fuel feed (a detection of a second filling-up fuel feed).

Also, when a large inclination or the like occurs in a vehicle, the first float 6 and the second float 7 close the first valve opening 1 and the second valve opening 2 so as to prevent the fuel from leaking out of the fuel tank T.

Namely, the first float 6 functions as a valve member of a filling-up fuel-feed detection valve, and the second float 7 functions as a valve member of a roll-over valve.

Also, in the valve device V, the first valve chamber 3 and the second valve chamber 4 are formed such that a lower-portion part 11 comprising the support portion 3*a* and the open end 3*e* of the first float 6, and the support portion 4*a* of the second float 7 fits relative to a device-upper portion 10 comprising the first valve opening 1 and the second valve opening 2.

Thereby, in such valve device V, without changing a structure of the device-upper portion 10, the lower-portion part 11 is replaced so as to change the fuel liquid level inside the fuel tank T which is detected as the filling-up fuel feed in the aforementioned manner Namely, when the lower-portion part 11 for raising a level of the open end 3*e* of the first valve chamber 3 is combined with the device-upper portion 10, the fuel liquid level inside the fuel tank T which is detected as the filling-up fuel feed in the aforementioned manner rises, and when the lower-portion part 11 for lowering the level of the open end 3*e* of the first valve chamber 3 is combined with the device-upper portion 10, the fuel liquid level inside the fuel tank T which is detected as the filling-up fuel feed in the aforementioned manner goes down.

The device-upper portion 10 is formed by combining the flange-forming member 10*a* and the trunk member 10*b*.

The flange-forming member 10*a* has a structure wherein an outer flange 10*d* is formed between an upper end and a lower end of a cylindrical member 10*c* closing the upper end and opening at the lower end. Between the upper end and the outer flange 10*d*, there is formed a connecting pipe portion 10*e* extending laterally by communicating one pipe end thereof with a space inside the flange-forming member 10*a*.

The trunk member 10*b* has a structure of forming a transverse partition wall 10*h* at an upper end of a cylindrical member 10*g* having an outer diameter substantially equal to an inner diameter of the flange-forming member 10*a*, and comprising a longitudinal partition wall 5*a* which becomes the partition wall 5 dividing an inside of the trunk member 10*b* into two along between the transverse partition wall 10*h* and a lower end.

On one side sandwiching a center of the transverse partition wall 10*h*, there is formed the first valve opening 1, and on the other side sandwiching the center of the transverse partition wall 10*h*, there is formed the second valve opening 2.

In the illustrated example, the first valve opening 1 has a circular hole passing through the transverse partition wall 10*h* up and down.

On the other hand, in the illustrated example, the second valve opening 2 is formed at a lower end of an enlarged portion 12 projecting downwardly from a lower face of the transverse partition wall 10*h*. On an upper side of the second valve opening 2, there is formed a storage chamber 13 for a valve member 14 which becomes a check valve. The valve member 14 forming the check valve is formed by a shaft-shaped inside valve member 14*a* and a tubular outside valve member 14*b*. The outside valve member 14*b* is pressed against a circular step face 13*a* upwardly formed in a position of an approximately middle in an up-and-down direction of the storage chamber 13 from above by an urging force of a spring shown by the reference numeral 15 in the drawings. On the other hand, the inside valve member 14*a* is pressed against a lower-end opening edge 14*c* of the outside valve member 14*b* from below by an urging force of a spring shown by the reference numeral 16 in the drawings.

In the illustrated example, when the inside of the fuel tank T comes to have a predetermined high pressure, the outside valve member 14*b* moves upwardly to release a seal of the circular step face 13*a* so as to discharge a gas inside the fuel tank T to the outside of the fuel tank T through the second valve opening 2. Also, when the inside of the fuel tank T comes to have a predetermined low pressure, the inside valve member 14*a* moves downwardly to release a seal of the lower-end opening edge 14*c* of the outside valve member 14*b* so as to send an outside air into the fuel tank T through the second valve opening 2.

Figure 2:
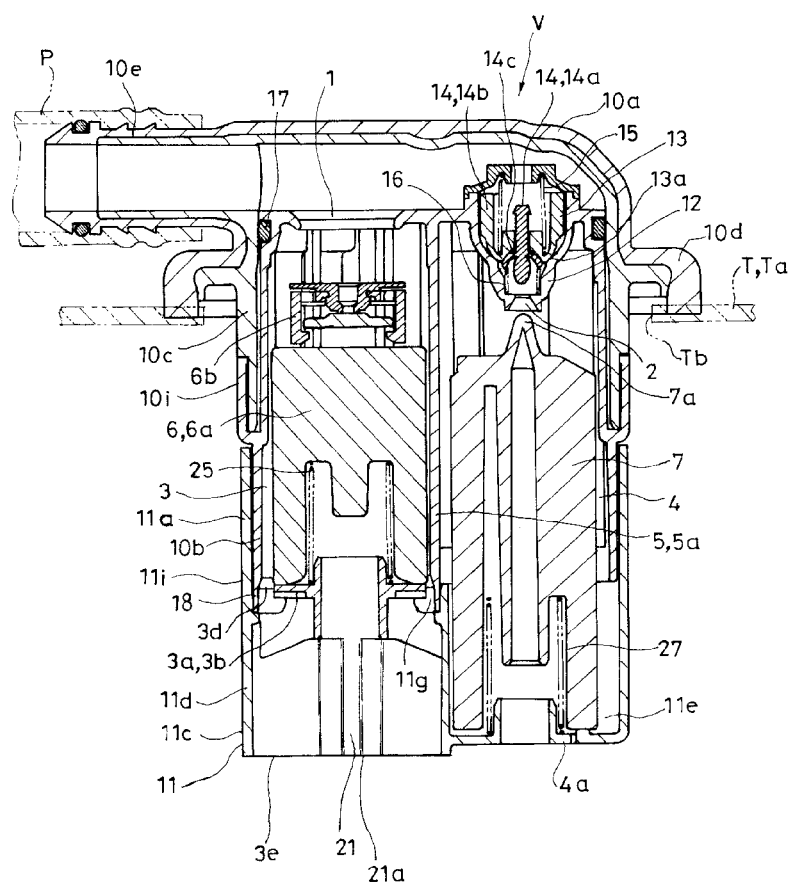
FIG. 2 is a cross-sectional view of the valve device, and shows an upper portion of a fuel tank, and a pipe to be connected to the valve device by imaginary lines.
Figure 7:
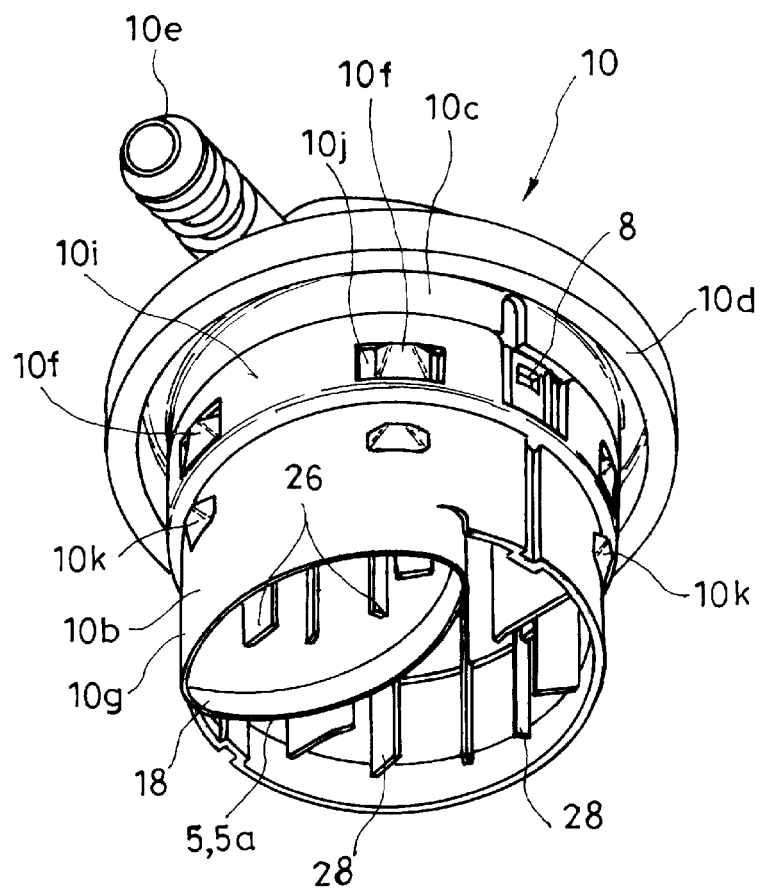
FIG. 7 is a perspective view of a device-upper portion forming the valve device.
Figure 8:
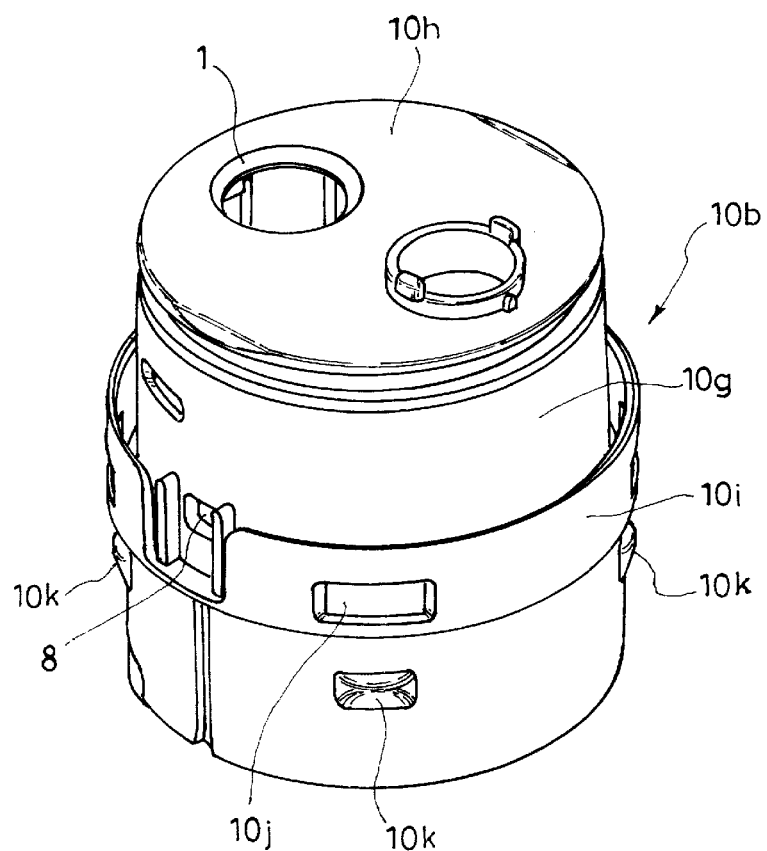
FIG. 8 is a perspective view of the trunk member forming the valve device.

An outer diameter of the trunk member 10*b* is substantially equal to an inner diameter of the cylindrical member 10*c* of the flange-forming member 10*a*. On an outside of the trunk member 10*b*, there is formed an outside wall 10*i* forming a gap to house a lower end side of the flange-forming member 10*a*, and engagement projections 10*f* shown by the symbol 10*f* in the drawings and formed on an outside of the cylindrical member 10*c* engage window holes 10*j* on the outside wall 10*i*, so that the flange-forming member 10*a* and the trunk member 10*b* are combined (FIG. 7). In this combined state, an internal space of the flange-forming member 10*a* and an internal space of the trunk member 10*b* communicate only through the first valve opening 1 and the second valve opening 2. In FIG. 2, the reference numeral 17 represents a seal ring between an inner face of the flange-forming member 10*a* and an outer face of the trunk member 10*b*.

In the illustrated example, a portion positioned in a side lower than the outer flange 10*d* of the flange-forming member 10*a* is housed in the attachment hole Tb formed in the fuel tank T, and the outer flange 10*d* is welded to an outer face portion of the fuel tank T so as to attach the valve device V to the fuel tank T. The connecting pipe portion 10*e* is inserted into a pipe P forming the ventilation passage, thereby the inside and outside of the fuel tank T are communicated through the valve device V (FIG. 2).

Figure 11:
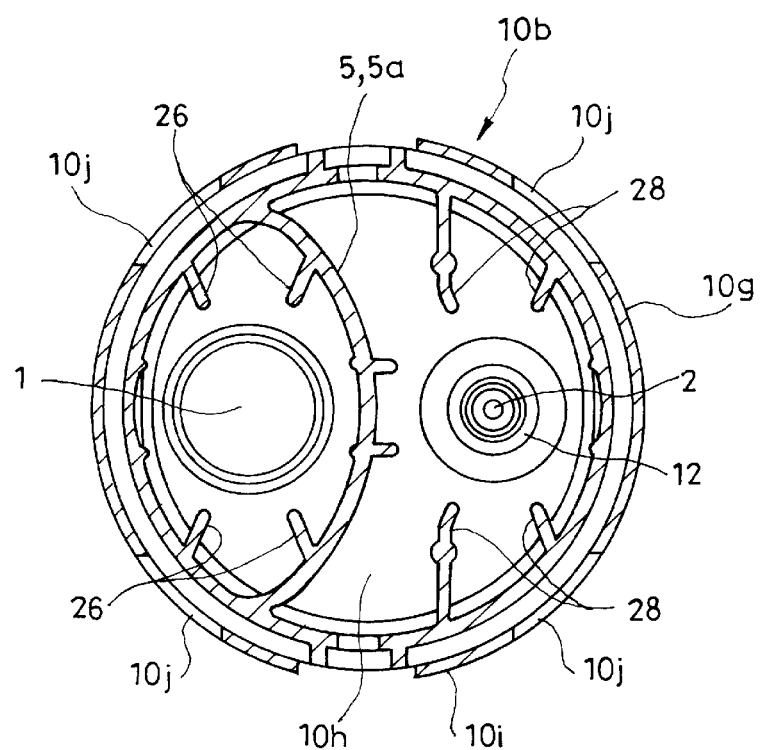
FIG. 11 is a cross-sectional view taken along a line C-C in FIG. 10.
Figure 12:
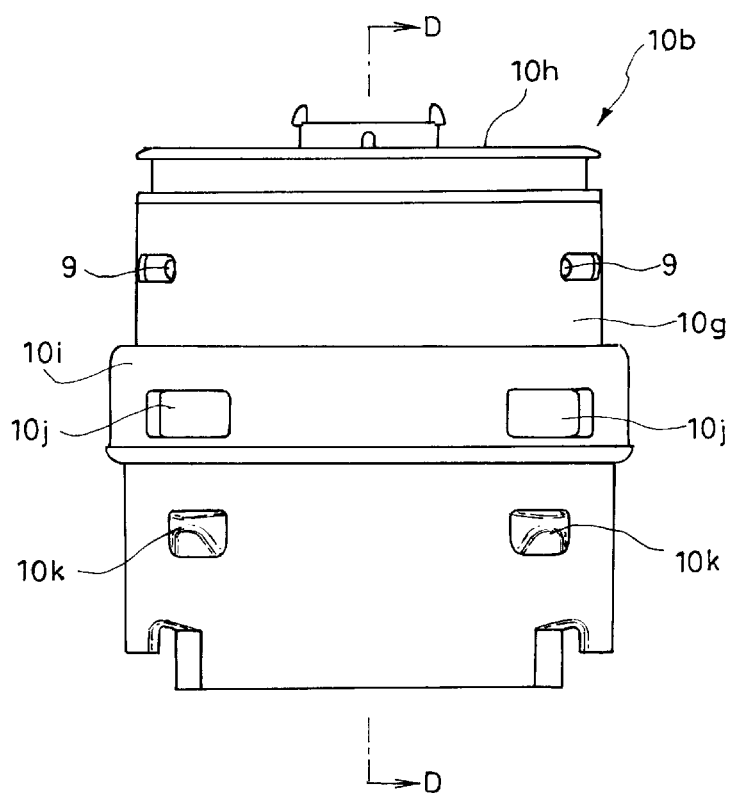
FIG. 12 is a side view of the trunk member forming the valve device.
Figure 13:
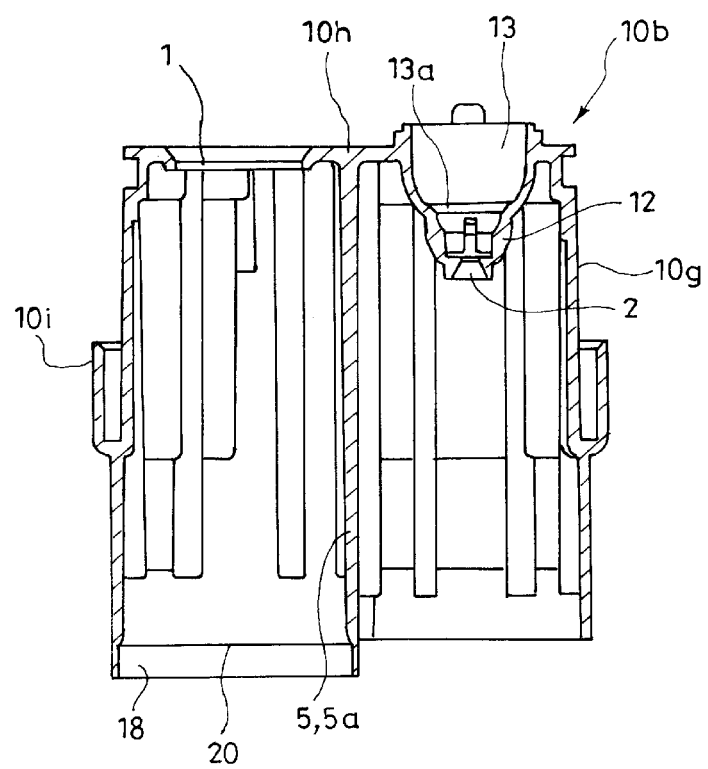
FIG. 13 is a cross-sectional view taken along a line D-D in FIG. 12.

The longitudinal partition wall 5*a* has a structure formed on one side sandwiching a virtual vertical surface S (see FIG. 3) dividing the trunk member 10*b* into two right and left parts, and forming a space which becomes the first valve chamber 3 having an oval shape on an outline in a horizontal cross section between the longitudinal partition wall 5*a* and a side face of the trunk member 10*b* positioned in the one side. Namely, the longitudinal partition wall 5*a* has a structure having a curve wherein the other side sandwiching the virtual vertical surface S is a curve outside (FIG. 7, FIG. 9, and FIG. 11).

Outside the longitudinal partition wall 5*a* curved in the trunk member 10*b*, there is formed a space which becomes the second valve chamber 4. The space which becomes the second valve chamber 4 has a crescent shape on an outline in a horizontal cross section (FIG. 7, FIG. 9, and FIG. 11).

Figure 9:
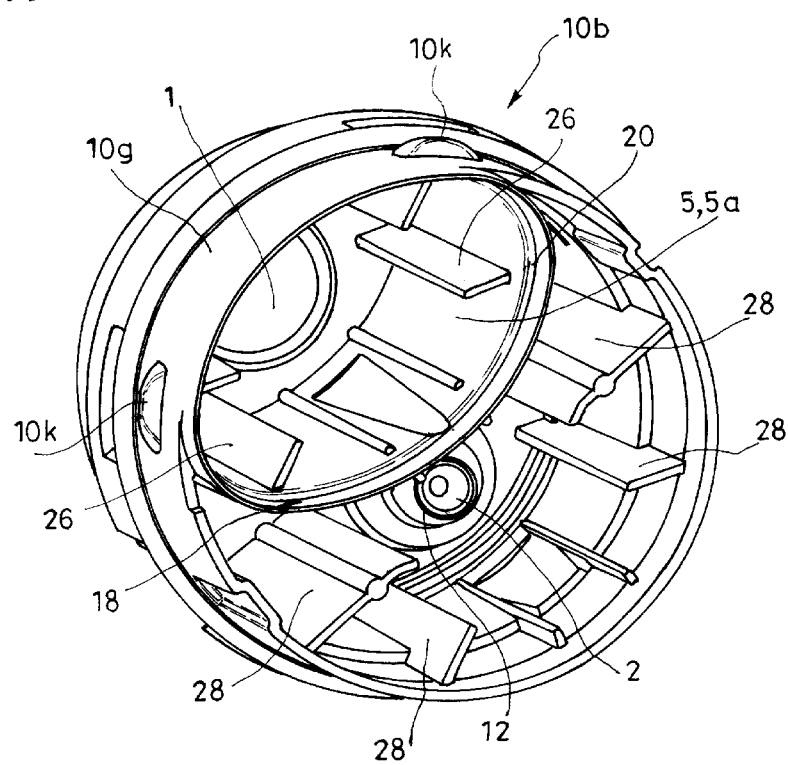
FIG. 9 is a perspective view of the trunk member forming the valve device.
Figure 10:
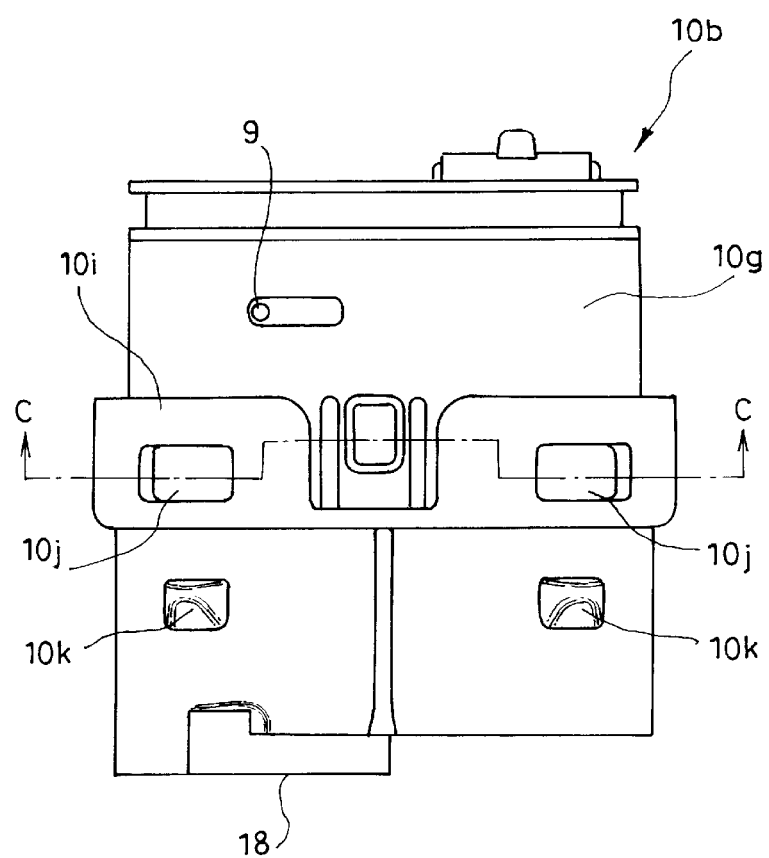
FIG. 10 is a side view of the trunk member forming the valve device.

In the present embodiment, lower ends of the longitudinal partition wall 5*a* and one portion of the trunk member 10*b* forming the space which becomes the first valve chamber 3 project downwardly more than the lower end of the trunk member 10*b* forming the space which becomes the second valve chamber 4 (FIG. 7 and FIG. 9).

On the other hand, the lower-portion part 11 is formed to have a cylindrical shape at an upper side of the support portion 3*a* of the first float 6, and to comprise a skirt portion 11*d* and the support portion 4*a* of the second float 7 at a lower side of the support portion 3*a*.

In an upper-side portion 11*a* which becomes an upper side of the support portion 3*a* of the first float 6 in the lower-portion part 11, an inner diameter thereof is substantially equal to the outer diameter of the trunk member 10*b* of the device-upper portion 10. In the illustrated example, by engaging engagement projections shown by the symbol 10*k* in the drawings and formed on an outside of the trunk member 10b with window holes 11b formed in the upper-side portion 11a of the lower-portion part 11, the device-upper portion 10 and the lower-portion part 11 are combined (see FIG. 1).

A lower-side portion 11c which becomes the lower side of the support portion 3a of the first float 6 in the lower-portion part 11 becomes the skirt portion 11d having a substantially semicircular shape on an outline in a horizontal cross section in one side along the virtual vertical surface S (see FIG. 3) dividing the lower-portion part 11 into two right and left parts.

Also, the lower-side portion 11c in the lower-portion part 11 becomes a rectangular cylindrical storage portion 11e for the second float 7 having a substantially square shape on an outline in a horizontal cross section in the other side along the virtual vertical surface S dividing the lower-portion part 11 into two right and left parts.

A lower end of the skirt portion 11d functions as the open end 3e. Also, a transverse plate portion covering a lower end of the rectangular cylindrical storage portion 11e functions as the support portion 4a of the second float 7.

Figure 15:
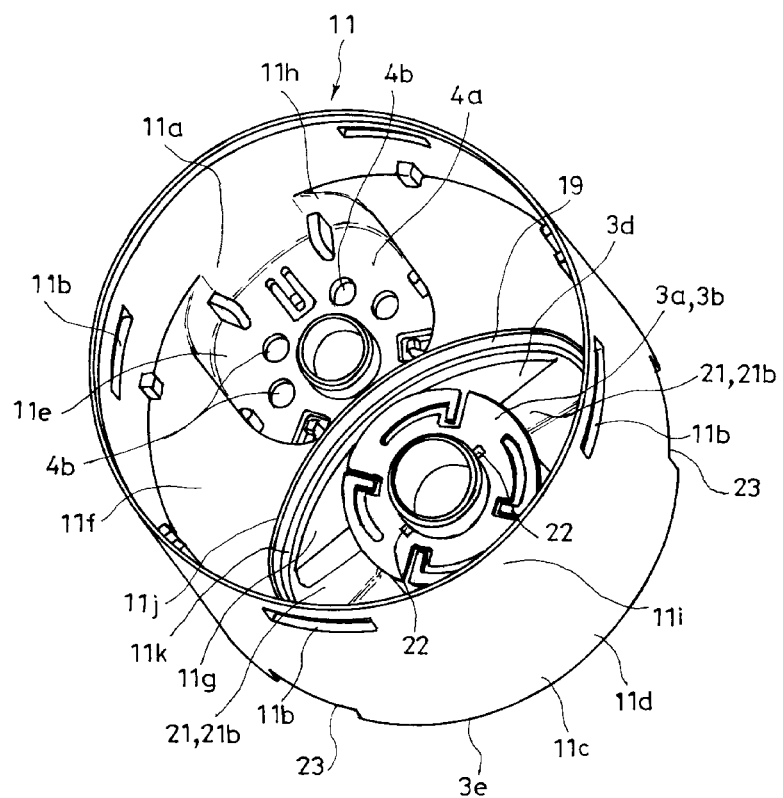
FIG. 15 is a perspective view of the lower-portion part forming the valve device.

In the illustrated example, in a transverse partition wall 11f partitioning between the upper-side portion 11a and the lower-side portion 11c of the lower-portion part 11, there is formed an oval through hole 11g in one side sandwiching the virtual vertical surface S, and in the other side sandwiching the virtual vertical surface S, there is formed a square through hole 11a having a substantially square shape communicating with the rectangular cylindrical storage portion 11e (FIG. 15).

Figure 14:
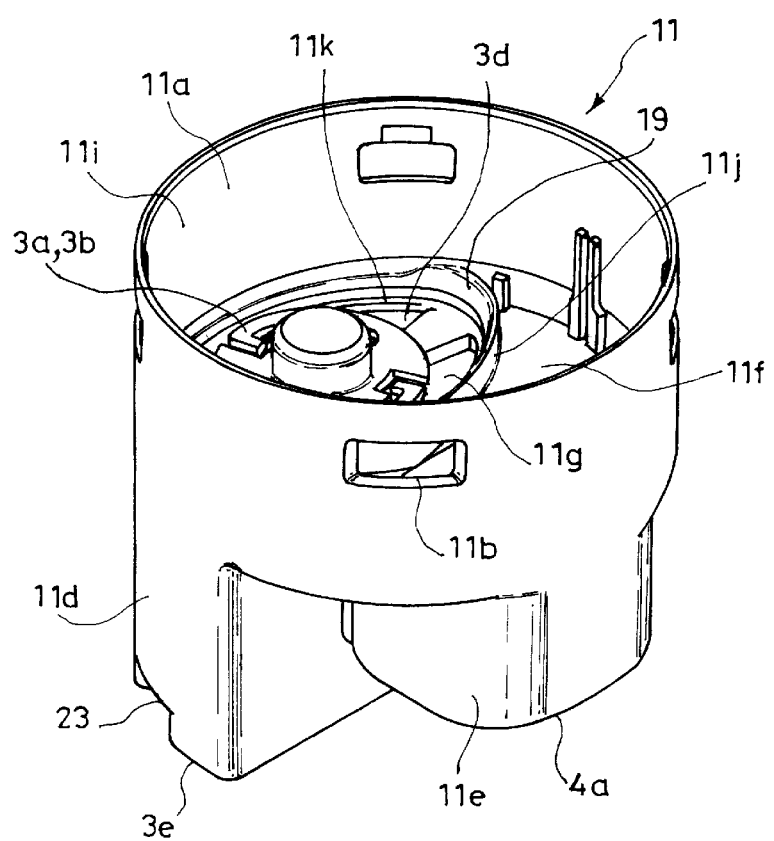
FIG. 14 is a perspective view of a lower-portion part forming the valve device.

The oval through hole 11g has a structure of forming the space which becomes the first valve chamber 3. Substantially half of the oval through hole 11g is formed by a side face 11i of the lower-portion part 11. A portion which becomes half of the remaining oval through hole 11g is bordered by a rising portion 11j on an upper face side of the transverse partition wall 11f (FIG. 14 and FIG. 15). Also, in a hole edge portion of the oval through hole 11g, there is formed an upward step face 11k along a circumference direction surrounding a center of the oval through hole 11g at a portion which becomes a side slightly lower than the rising portion 11j.

In the present embodiment, when the lower-portion part 11 is combined with the device-upper portion 10 in the aforementioned manner, the longitudinal partition wall 5a and a lower end (hereinafter, the lower end thereof will be called a fitted portion 18) of one portion of the trunk member 10b forming the space which becomes the first valve chamber 3 in the trunk member 10b of the device-upper portion 10 fit into the side face 11i and the rising portion 11j (hereinafter, those will be called a fitting portion 19) of the lower-portion part 11 surrounding the oval through hole 11g of the lower-portion part 11, so that the first valve chamber 3 and the second valve chamber 4 are formed in a state sealed between both the chambers in an airtight manner.

Namely, in the present embodiment, the fitted portion 18 of the device-upper portion 10 forming the first valve chamber 3 is formed to have an oval shape on an outline in a horizontal cross section, and when the device-upper portion 10 and the lower-portion part 11 fit together, an outline in a horizontal cross section of the fitting portion 19 of the lower-portion part 11 which fits into the fitted portion 18 has an oval shape substantially matching the outline of the fitted portion 18.

In a case wherein the outlines in the horizontal cross sections of the fitting portion 19 and the fitted portion 18 have straight-line portions, without having a high dimensional accuracy of both portions, when both portions fit together, there can be easily formed a portion which is difficult to apply a certain level of fitting force between both portions. On the other hand, in the present embodiment, the outlines in the horizontal cross sections of the fitting portion 19 and the fitted portion 18 have the oval shapes, so that when both portions fit together, at each position surrounding the center of the oval shape, both portions can tightly contact with each other by the certain amount of fitting force as much as possible. Thereby, in the present embodiment, only by simply combining the device-upper portion 10 and the lower-portion part 11, without requiring the seal ring, welding, and the like, the first valve chamber 3 and the second valve chamber 4 can be appropriately formed by the device-upper portion 10 and the lower-portion part 11 in a state wherein there is almost no ventilation between the first valve chamber 3 and the second valve chamber 4. Therewith, by doing that, a cross-sectional area of the first valve chamber 3 formed inside the valve device V having a substantially circular shape of the outline in the horizontal cross section can be maximized.

Namely, in the present embodiment, the fitted portion 18 and the fitting portion 19 fit together in the airtight state. Incidentally, the airtight state in the present specification means that there is no ventilation generated with a level of impairing a function of the valve device V between the first valve chamber 3 and the second valve chamber 4, and does not mean a complete airtight state.

Also, in the present embodiment, the fitted portion 18 and the fitting portion 19 fit together in such a way so as to position one of the fitted portion 18 and the fitting portion 19 on the inner side of the other of the fitted portion 18 and the fitting portion 19.

Also, in the present embodiment, the device-upper portion 10 and the lower-portion part 11 are made of synthetic resin, and both the fitted portion 18 and the fitting portion 19, or either one of the fitted portion 18 or the fitting portion 19 are/is formed to be thin. In the illustrated example, the fitted portion 18 is formed to be thin in such a way so as to form a step 20 inside the first valve chamber 3 between the fitted portion 18 and an inner face of the trunk member 10b which is located above the fitted portion 18 (see FIG. 9). Thereby, when the fitted portion 18 and the fitting portion 19 fit together, a fitted-portion 18 side is easily elastically deformed, and compared to another portion, a fit portion is formed so as to become thin as little as possible.

Inside the oval through hole 11g formed in the transverse partition wall 10h of the lower-portion part 11, there is formed the support portion 3a of the first float 6.

In the illustrated example, the support portion 3a of the first float 6 is formed by including a disk-shaped member 3b disposed at a center of the oval through hole 11g. Such disk-shaped member 3b is supported by supporting column portions 21 formed inside the lower-portion part 11 in such a way so as to be positioned directly below a bottom portion of the first float 6.

The supporting column portions 21 project toward a center side of the oval through hole 11g from an inner side of the skirt portion 11d of the lower-portion part 11. The supporting column portions 21 are formed along an up-and-down direction of the skirt portion 11d. Also, an inside of the supporting column portions 21 is hollow. Also, a lower end 21a of each supporting column portion 21 is open, and an upper end 21b of the supporting column portion 21 is closed. In the illustrated example, the supporting column portion 21 is formed in such a way so as to project toward the center of the oval through hole 11g respectively from a portion facing a short shaft of the oval through hole 11g in the skirt portion 11d (see FIG. 3). In the illustrated example, in a state wherein the skirt portion 11d is located in a horizontal cross section, the supporting column portion 21 is formed in such a way so as to have a substantially same outline at any position along the up-and-down direction, and is formed by the side face 11i of the lower-portion part 11; a wall face 21c positioned on the center side of the oval through hole 11g facing the side face 11i; and two wall faces 21d formed to be elongated between the wall face 21c and the side face 11i, and forming a space having a flat square shape gradually decreasing as approaching the center side of the oval through hole 11g.

The disk-shaped member 3b is supported like a floating island at the center of the oval through hole 11g by a pair of supporting column portions 21 by integrating a lower face of the disk-shaped member 3b with the upper end 21b positioned in the center side of the oval through hole 11g of the pair of supporting column portions 21. A gap formed between the oval through hole 11g and the disk-shaped member 3b functions as the passage portion 3d for the fluid of the support portion 3a of the first float 6.

In the disk-shaped member 3b, there are formed the orifices 22 communicating with the inside of the supporting column portions 21. On the other hand, although the lower end 21a of each supporting column portion 21 corresponds to the open end 3e of the skirt portion 11d on the inner side of the skirt portion 11d (lower ends of the wall faces 21c and 21d), on an outside of the skirt portion 11d, the lower end 21a of each supporting column portion 21 is positioned at a side slightly upper than the open end 3e of the skirt portion 11d by the notch portion 23 cut at one portion of an outer shell (the side face 11i of the lower-portion part 11) forming the skirt portion 11d from below. An upper edge (the lower end 21a of the supporting column portion 21 outside the skirt portion 11d/the entrances 24a of the ventilation paths 24 for the later-described orifices 22) of the notch portions 23 is substantially horizontal, and a left edge and a right edge of the notch portions 23 are substantially perpendicular, and the notch portions 23 open on a lower side.

When the detection of the first filling-up fuel feed is carried out, although the gas inside the fuel tank T enters into the first valve chamber 3 from the orifices 22 to create intense foaming inside the fuel entered into the first valve chamber 3, since the orifices 2 are formed in the support portion 3a positioned below the first float 6, a condition wherein the gas entered from the orifices 22 impacts on a regular rise of the first float 6 can be reduced as little as possible. Also, a condition, wherein before the first float 6 rises to close the first valve opening 1, the gas passes a side of the first float 6 so as to blow out the fuel inside the first valve chamber 3 to the outside through the first valve opening 1, can be reduced as little as possible. Thereby, in the present embodiment, at the same time when the fuel liquid level reaches the open end 3e of the first valve chamber 3, the first float 6 rises to close the first valve opening 1 so as to reliably carry out the detection of the first filling-up fuel feed.

Then, in the present embodiment, after the fuel feed stops by the detection of the filling-up fuel feed, and the pressure inside the fuel tank T is reduced by the ventilation through the second valve chamber 4 and the second valve opening 2, the first float 6 descends to open the first valve opening 1, and the ventilation through the lower end of the supporting column portion 21, the orifices 22, and the first valve opening 1 is secured as well, thereby allowing the additional fuel feed until the fuel liquid level reaches the upper edge of the notch portions 23.

Namely, in the present embodiment, the orifices 22 are formed in the support portion, and by the notch portions 23 formed in the open-end 3e side of the first valve chamber 3, there are formed the entrances 24a of the orifice-ventilation paths 24 communicating with the orifices 22 below the support portion 3a and above the open end 3e. In the illustrated example, the inside of the supporting column portion 21 functions as the orifice-ventilation paths 24, and one portion of the lower end 21a of the supporting column portion 21 functions as the entrances 24a of the orifice-ventilation paths 24.

Then, when the fuel liquid level inside the fuel tank T reaches the open end 3e of the first valve chamber 3, the internal pressure of the fuel tank T rises so as to detect the filling-up fuel feed by the sensor on the fuel-feed gun side, and to allow the additional fuel feed after the detection of the filling-up fuel feed until the liquid level reaches the entrances 24a of the orifice-ventilation paths 24.

Also, in the present embodiment, two or more orifices 22 are formed in the support portion 3a, and the orifice-ventilation paths 24 respectively corresponding to the respective orifices 22 are formed.

Figure 3:
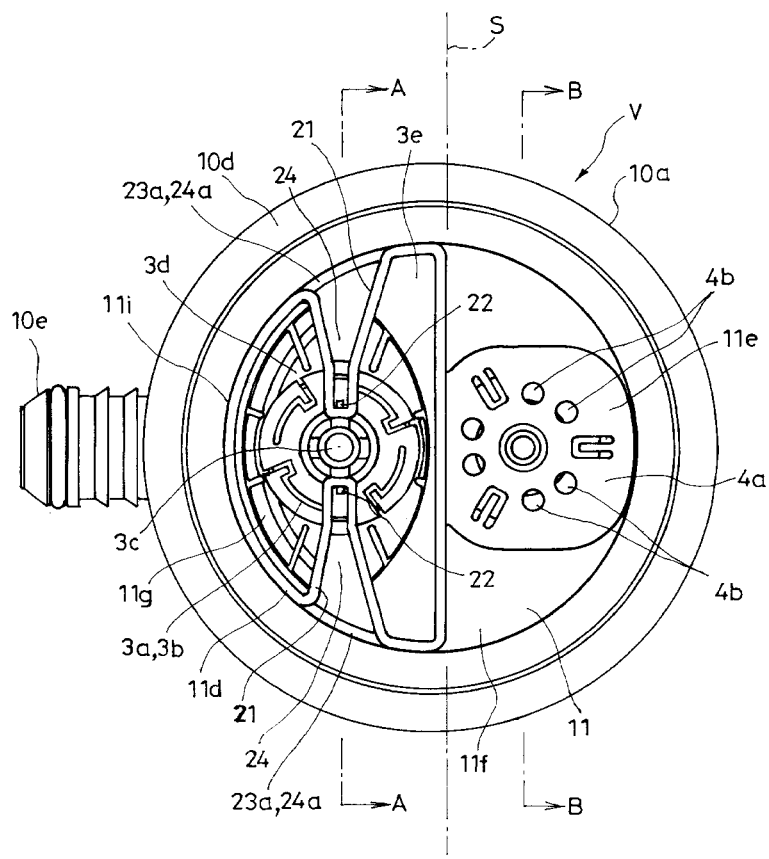
FIG. 3 is a bottom view of the valve device.
Figure 4:
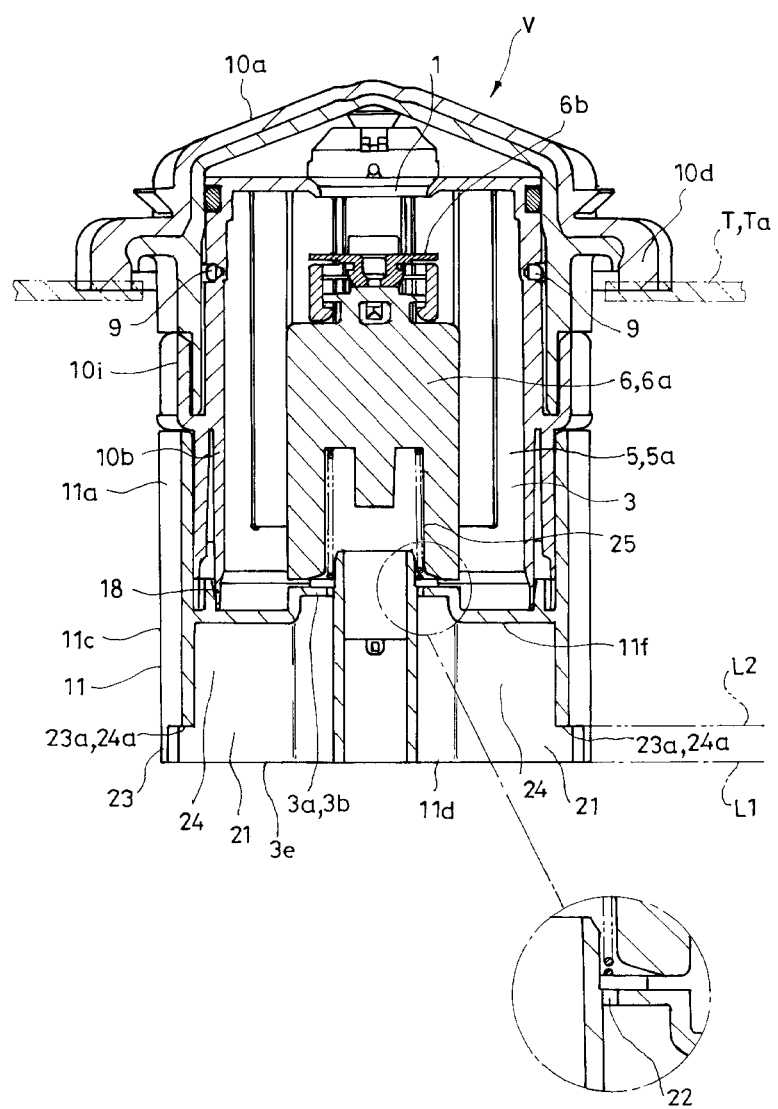
FIG. 4 is a cross-sectional view taken along a line A-A in FIG. 3.
Figure 5:
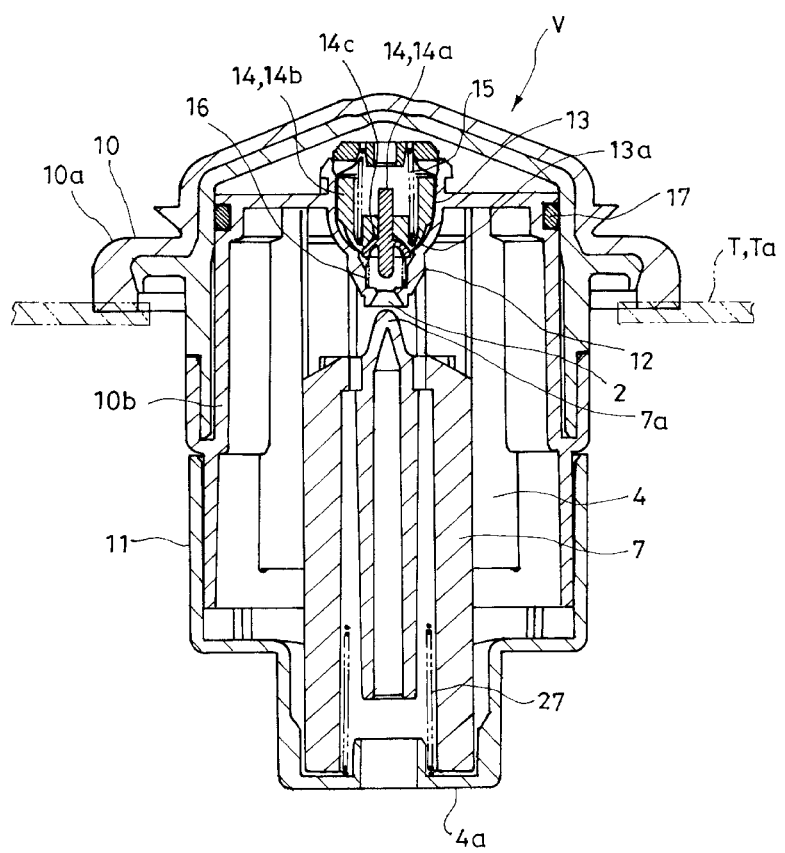
FIG. 5 is a cross-sectional view taken along a line B-B in FIG. 3.
Figure 6:
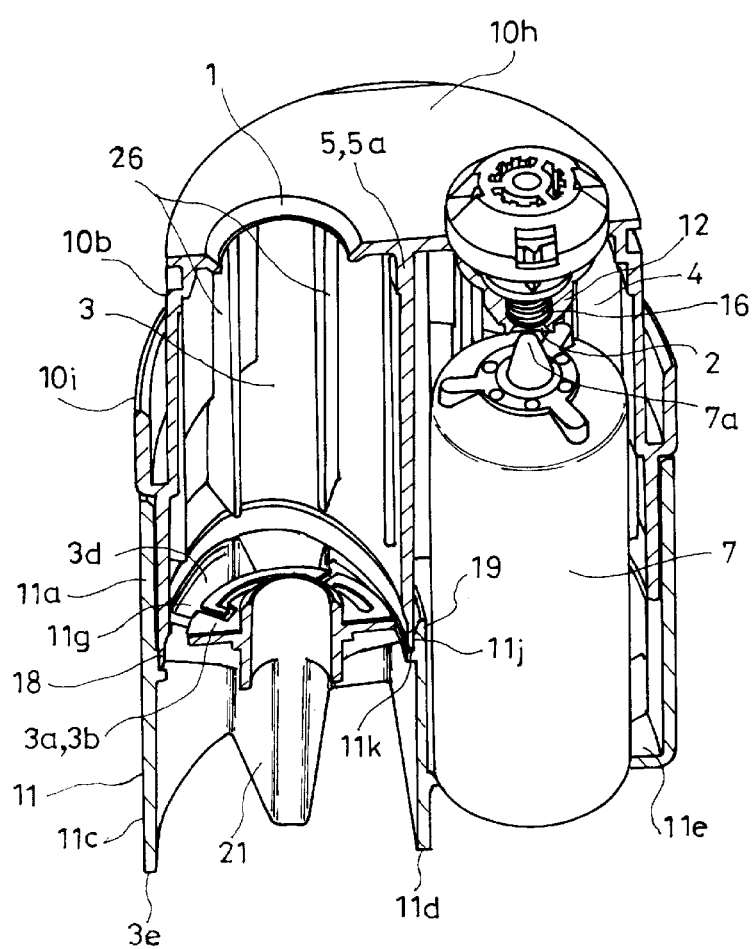
FIG. 6 is a partially cut perspective view of essential parts of a trunk member forming the valve device, wherein a first float is omitted.

More specifically, in the present embodiment, the orifices 22 are respectively formed at a symmetric position sandwiching a center 3c of the support portion 3a positioned on a center shaft of the first float 6, in the illustrated example, the center 3c of the disk-shaped member 3b, and at a portion directly below the bottom portion of the first float 6 (see FIG. 3).

The first float 6 has a structure comprising a main member portion 6a having a column shape and a movable member 6b combined with an upper portion of the main member portion 6a. The first float 6 is housed inside the first valve chamber 3 to be movable between a lower position of contacting a lower end of the first float 6 with the support portion 3a of the first valve chamber 3; and an elevated position of closing the first valve opening 1 by the movable member 6b. The reference numeral 25 represents a spring interposed between the support portion and the first float 6, and providing a certain amount of upward force to the first float 6. The first float 6 and the spring 25 are housed between the device-upper portion 10 and the lower-portion part 11 before the device-upper portion 10 and the lower-portion part 11 are combined. Inside the device-upper portion 10, there is formed a plurality of ribs 26 along an up-and-down direction where the first float 6 is positioned directly below the first valve opening 1. A portion between adjacent ribs 26 respectively becomes one portion of the ventilation passage. When the fuel flows into the first valve chamber 3, the first float 6 moves up to the elevated position, and an upper face of the movable member 6b closes the first valve opening 1. When the fuel feed is stopped, and the fuel flows out of the first valve chamber 3, the first float 6 moves up to the lowered position, and the first valve opening 1 is opened. At that time, even when a force attaching the movable member 6b to the first valve opening 1 is applied, by a weight of the main member portion 6a, while inclining the movable member 6b, the movable member 6b can be peeled off from the first valve opening 1.

The second float 7 has the column shape and a structure comprising a conical projecting portion 7a at an upper portion thereof. The second float 7 is housed inside the second valve chamber 4 to be movable between a position contacting a lower end of the second float 7 with the support portion 4a of the second valve chamber 4, and a position closing the second valve opening 2 by entering the projecting portion 7a into the second valve opening 2. In the support portion 4a of the second valve chamber 4, there is formed a plurality of through holes functioning as the passage portion 4b for the fluid. The reference numeral 27 shown in the drawings represents a spring interposed between the support portion and the second float 7, and providing a certain amount of upward force to the second float 7. The second float 7 and the spring 27 are housed between the device-upper portion 10 and the lower-portion part 11 before the device-upper portion 10 and the lower-portion part 11 are combined. Inside the device-upper portion 10, there is formed a plurality of ribs 28 along an up-and-down direction where the second float 7 is positioned directly below the second valve opening 2. A portion between adjacent ribs 28 respectively becomes one portion of the ventilation passage. When the large inclination or the like occurs in the vehicle, the second float 7 moves up to a position closing the second valve opening 2, and the projecting portion 7a closes the second valve opening 2.

Incidentally, obviously, the present invention is not limited to the embodiments explained hereinabove, and includes all embodiments which can obtain the object of the present invention.

While the invention has been explained with reference to the specific embodiments of the invention, the explanation is illustrative and the invention is limited only by the appended claims.

What is claimed is:

1. A valve device for a fuel tank, comprising:
   a first valve opening and a second valve opening for communicating inside and outside of a fuel tank, the second valve opening being separately disposed from the first valve opening;
   a first valve chamber formed below the first valve opening and including an open end at a lower end of the first valve chamber and a first orifice for communicating the first valve chamber and the inside of the fuel tank, and a second valve chamber formed below the second valve opening and including a ventilation window hole for communicating the second valve chamber and the inside of the fuel tank;
   a first float disposed in the first valve chamber to move up and down therein;
   a first support portion movably supporting the first float in the first valve chamber and having a first passage portion for a fluid, and a second orifice, and a second support portion disposed in the second valve chamber; and
   a notch portion disposed in the first valve chamber to form an entrance of an orifice-ventilation path communicating with the second orifice at a position lower than the first support portion and higher than the open end,
   wherein
   the first orifice is disposed at a side of the first valve chamber and above the first support portion such that when the first float moves up to close the first valve opening, the first valve chamber and the inside of the fuel tank are communicated through the first orifice to reduce an internal pressure of the first valve chamber, and
   the ventilation window hole is disposed at a side of the second valve chamber and above the second support portion such that when the first float closes the first valve opening, the inside of the fuel tank and the outside of the fuel tank are communicated through the second valve opening and the ventilation window hole.

2. A valve device for a fuel tank according to claim 1, wherein an upper edge of the notch portion is disposed at a position higher than the open end such that after the first float moves down toward the first support portion by reducing the internal pressure of the first valve chamber, an additional fuel is fed to the fuel tank until a fuel liquid level inside the fuel tank reaches the upper edge of the notch portion.

3. A valve device for a fuel tank according to claim 1, wherein the first support portion includes at least two second orifices, and the orifice-ventilation path includes at least two paths, each corresponding to each of the at least two second orifices.

4. A valve device for a fuel tank according to claim 3, wherein the at least two second orifices are formed in the first support portion at positions symmetrical to each other relative to a center axis passing through a center of the first float.

5. A valve device for a fuel tank according to claim 1, further comprising:
   a second float supported on the second support portion to move up and down in the second valve chamber,
   a device-upper portion including the first valve opening, the second valve opening, the first orifice, the ventilation window hole, and a partition wall,
   a device-lower portion engaged to the device-upper portion to form an inside space, and including the open end, the first support portion, and the second support portion,
   wherein the partition wall partitions the inside space into the first valve chamber and the second valve chamber.

6. A valve device for a fuel tank according to claim 5, wherein the first valve opening and the second valve opening are disposed at an upper portion of the device-upper portion, and the first valve chamber and the second valve chamber are disposed adjacent to each other through the partition wall,
   the device-lower portion further includes:
   a cylindrical portion,
   a skirt portion extending downwardly from the cylindrical portion under the first support portion, the skirt portion having the open end at a lower end thereof and one portion of the skirt portion being cut from the lower end thereof to form the notch portion, and
   a supporting column portion projecting inwardly from side edges of the notch portion and extending upwardly to the first support portion along an inner surface of the skirt portion to support the first support portion, the orifice-ventilation path being formed inside the supporting column portion between the notch portion to the second orifice.

7. A valve device for a fuel tank according to claim 6, wherein the first support portion includes a disk-shaped member disposed on an upper end of the supporting column portion and having the second orifice at a center portion thereof to face an inside of the supporting column portion, and the first passage portion around the disk-shaped member through which the fluid flows in the first valve chamber, and
   the cylindrical portion has bottom end portion on which the first support portion is disposed at a side of the first valve chamber and a storage portion is disposed at a side of the second valve chamber, the storage portion extending downwardly from the bottom end portion and having the second support portion and a second passage portion through which a fluid flows in the second valve chamber.

\* \* \* \* \*